United States Patent
Kim et al.

(10) Patent No.: US 9,230,761 B2
(45) Date of Patent: Jan. 5, 2016

(54) EMERGENCY STOP SYSTEM FOR A HYBRID EXCAVATOR

(75) Inventors: Ji-Yun Kim, Changwon-si (KR); Eui-Chul Kim, Changwon-si (KR); Dong-Uk Choi, Changwon-si (KR)

(73) Assignee: VOLVO CONSTRUCTION EQUIPMENT AB (SE)

( * ) Notice: Subject to any disclaimer, the term of this patent is extended or adjusted under 35 U.S.C. 154(b) by 411 days.

(21) Appl. No.: 13/811,105

(22) PCT Filed: Jul. 21, 2010

(86) PCT No.: PCT/KR2010/004760
§ 371 (c)(1),
(2), (4) Date: Jan. 18, 2013

(87) PCT Pub. No.: WO2012/011618
PCT Pub. Date: Jan. 26, 2012

(65) Prior Publication Data
US 2013/0119784 A1    May 16, 2013

(51) Int. Cl.
*H01H 35/00* (2006.01)
*E02F 9/20* (2006.01)
*E02F 9/24* (2006.01)
*E02F 9/26* (2006.01)
(Continued)

(52) U.S. Cl.
CPC .............. *H01H 35/006* (2013.01); *B60W 10/08* (2013.01); *B60W 10/26* (2013.01); *B60W 20/50* (2013.01); *E02F 9/2075* (2013.01); *E02F 9/2091* (2013.01); *E02F 9/24* (2013.01); *E02F 9/267* (2013.01); *B60W 2540/04* (2013.01); *Y10T 307/937* (2015.04)

(58) Field of Classification Search
USPC .......................................................... 307/326
See application file for complete search history.

(56) References Cited

U.S. PATENT DOCUMENTS 5,422,808 A * 6/1995 Catanese et al. ................ 700/79

FOREIGN PATENT DOCUMENTS

JP     03-107332     5/1991
JP     08-152240 A   6/1996
(Continued)

OTHER PUBLICATIONS

International Search Report (in English and Korean) and Written Opinion of the International Searching Authority (in Korean) for PCT/KR2010/004760 mailed Apr. 26, 2011; ISA/KR.
(Continued)

*Primary Examiner* — Rexford Barnie
*Assistant Examiner* — Xuan Ly
(74) *Attorney, Agent, or Firm* — Harness, Dickey & Pierce, P.L.C.

(57) ABSTRACT

An emergency stop system for a hybrid excavator is provided, which includes an emergency switch and an emergency stop unit. In a normal operation state, a power supply that is applied from a power supply unit is provided to a hybrid controller and an engine controller, while when the emergency switch is pressed, the input power supply is intercepted to effectively stop the operation of the hybrid system in the case where equipment abnormality or an emergency situation occurs. Also, when the emergency switch is pressed, the power supply is applied to an emergency alarm unit and an energy discharge unit to notify an operator and neighboring persons of the equipment abnormality and emergency situation occurrence, and a hybrid power source vanishes completely.

3 Claims, 2 Drawing Sheets

(51) Int. Cl.
B60W 10/08 (2006.01)
B60W 10/26 (2006.01)
B60W 20/00 (2006.01)

(56) References Cited

FOREIGN PATENT DOCUMENTS

| | | | |
|---|---|---|---|
| JP | 11008945 A | | 1/1999 |
| JP | 2002173299 A | | 6/2002 |
| JP | 2008248627 | * | 10/2008 |
| JP | 2008248627 A | | 10/2008 |
| JP | 2008248627 A | * | 10/2008 |
| KR | 200441679 | * | 9/2008 |
| KR | 200441679 Y1 | | 9/2008 |

OTHER PUBLICATIONS

International Preliminary Report on Patentability (Chapter II) with one page annex for PCT/KR2010/004760, issued Nov. 23, 2012; IPEA/KR.

Office Action for Japanese Patent Application No. 2013-520627 dated Sep. 16, 2014.

* cited by examiner

EMERGENCY STOP SYSTEM FOR A HYBRID EXCAVATOR

TECHNICAL FIELD

The present invention relates to an emergency stop system for a hybrid excavator. More particularly, the present invention relates to an emergency stop system for a hybrid excavator, which makes a power supply that is applied from a power supply unit be supplied to a hybrid controller and an engine controller in a normal operation state, and makes an operation of a hybrid system be effectively stopped by intercepting the input power in the case where equipment abnormality or emergency situation occurs. Also, the present invention relates to an emergency stop system for a hybrid excavator, which makes the power be supplied to an emergency alarm unit and an energy discharge unit of the emergency stop system when the equipment abnormality or emergency situation occurs to notify an operator and neighboring persons of the occurrence of the equipment abnormality or the emergency situation and to make a hybrid power source of the hybrid excavator vanish completely.

BACKGROUND ART

A typical hybrid system includes a high-voltage energy storage device, a high-voltage motor, and several controllers. This hybrid system greatly contributes to the increase of energy efficiency, but has many risks at the same time. Since an unexpected controller malfunction or trouble of high-voltage components may occur at any time to cause an operator to be placed in dangerous situations, there is a need for a system that copes with such emergency situations.

DISCLOSURE

Technical Problem

Therefore, the present invention has been made to solve the above-mentioned problems occurring in the related art, and the subject to be solved by the present invention is to provide an emergency stop system for a hybrid excavator, which makes an operation of a hybrid system be effectively stopped in the case where equipment abnormality or emergency situation occurs, notifies an operator and neighboring persons of the occurrence of the equipment abnormality or emergency situation, and makes a hybrid power source vanish completely.

Technical Solution

In accordance with one aspect of the present invention, there is provided an emergency stop system for a hybrid excavator, which includes an emergency switch notifying of equipment abnormality and emergency situation occurrence; and an emergency stop unit including a first electric contact which is turned on in a normal operation state to provide an input power supply to a hybrid controller and an engine controller and is turned off when the emergency switch is pressed to intercept the input power supply to the hybrid controller and the engine controller, and a second electric contact which is turned on when the emergency switch is pressed to provide the input power supply through another path.

Preferably, the emergency stop system according to the aspect of the present invention may further include an emergency alarm unit connected to the second electric contact of the emergency stop unit to be driven by the input power supply applied thereto through the second electric contact when the input power supply to the hybrid controller and the engine controller is intercepted.

Further, the emergency stop system according to the aspect of the present invention may further include an energy discharge unit connected to the second electric contact of the emergency stop unit to discharge energy of an energy storage device by the input power supply applied thereto through the second electric contact when the input power supply to the hybrid controller and the engine controller is intercepted.

Preferably, in the emergency stop system according to the aspect of the present invention, at least one of an electric motor/generator controller, a swing electric motor controller, a swing electric motor parking brake, and energy storage device contactors, which are connected to the hybrid controller, may interlock with the input power supply, and be intercepted when the input power supply to the hybrid controller and the engine controller is intercepted.

Advantageous Effect

According to the present invention, in the normal operation state, the power that is applied from the power supply unit is supplied to the hybrid controller and the engine controller, whereas when the emergency switch is pressed, the power that is supplied to the hybrid controller and the engine controller is intercepted to effectively stop the operation of the hybrid system in the case where the equipment abnormality or emergency situation occurs.

Further, when the emergency switch is pressed, the power supply is applied to the emergency alarm unit and the energy discharge unit to notify the operator and neighboring persons of the occurrence of the equipment abnormality and emergency situation and to make the hybrid power source vanish completely.

BRIEF DESCRIPTION OF THE DRAWINGS

The above objects, other features and advantages of the present invention will become more apparent by describing the preferred embodiments thereof with reference to the accompanying drawings, in which.

DESCRIPTION OF REFERENCE NUMERALS IN THE DRAWING

Figure 1:
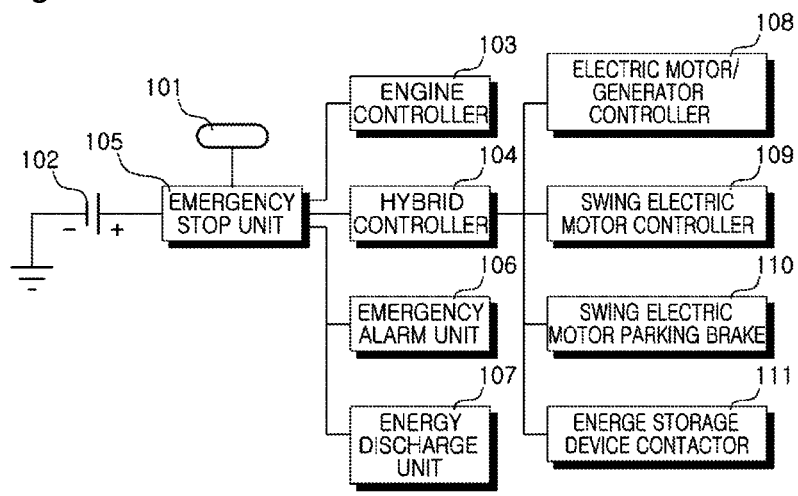
FIG. 1 is a block diagram illustrating the configuration of an emergency stop system for a hybrid excavator according to an embodiment of the present invention.

101: emergency switch
102: power supply unit
103: engine controller
104: hybrid controller
105: emergency stop unit
106: emergency alarm unit
107: energy discharge unit
108: electric motor/generator controller
109: swing electric motor controller
110: swing electric motor parking brake
111: energy storage device contactor

BEST MODE

FIG. 1 is a block diagram illustrating the configuration of an emergency stop system for a hybrid excavator according to an embodiment of the present invention.

As illustrated in FIG. 1, an emergency stop system for a hybrid excavator according to an embodiment of the present invention includes an emergency switch 101; an emergency stop unit 105 providing an electric power that is applied from a power supply unit 102 to an engine controller 103 and a hybrid controller 104 in a normal operation state, and intercepting the power supply to the engine controller 103 and the hybrid controller 104 and making the power applied to another path (for example, an emergency alarm unit or an energy discharge unit) when the emergency switch 101 is pressed (that is, in the case where equipment abnormality or emergency situation occurs); the emergency alarm unit 106 that is driven by the power applied thereto; and the energy discharge unit 107.

In addition, the power supply to an electric motor/generator controller 108, a swing electric motor controller 109, a swing electric motor parking brake 110, and energy storage device contactors 111, which are connected to the hybrid controller 104, is intercepted in association with the power supply interception when the power supply to the hybrid controller 104 is intercepted.

Here, the emergency switch 101 is a switch that is pressed, for example, according to an operator's key operation in the case where the equipment abnormality or emergency situation occurs, and is located on an operator's seat to promptly cope with the emergency situation.

The emergency stop unit 105 provides the power that is applied from the power supply unit 102 to the hybrid controller 104 and the engine controller 103 in a normal operation state, and intercepts the power supply to the hybrid controller 104 and the engine controller 103 and makes the power supplied to another path (for example, the emergency alarm unit or the energy discharge unit) when the emergency switch 101 is pressed. Accordingly, if the equipment abnormality or emergency situation occurs, the operation of the hybrid system can be effectively stopped, and the operator and neighboring persons can be notified of the occurrence of the equipment abnormality and emergency situation.

The emergency alarm unit 106 is configured so that the power is not supplied to the emergency alarm unit 106 in the normal operation state, but the power is supplied thereto when the emergency switch 101 is pressed, that is, when the equipment abnormality or the emergency situation occurs. If the power is supplied to the emergency alarm unit 106, the power being supplied to the hybrid controller 104 and the engine controller 103 is intercepted, and the emergency alarm unit 106 produces an alarm sound or turns on an alarm lamp to notify the outside of the equipment abnormality or emergency situation.

The energy discharge unit 107 is also configured so that the power is not supplied to the energy discharge unit 107 in the normal operation state, but the power is supplied thereto when the emergency switch 101 is pressed, that is, when the equipment abnormality or the emergency situation occurs. If the power is supplied to the energy discharge unit 107, the energy discharge unit 107 discharges energy of the energy storage device to make the hybrid power source vanish completely.

The electric motor/generator controller 108, the swing electric motor controller 109, the swing electric motor parking brake 110, and the energy storage device contactors 111 are configured so that the power supply thereto is intercepted in association with the interception of the power supply to the hybrid controller 104. As a result, the operations of the hybrid electric motor controller and the swing electric motor are physically stopped, and connections between the high-voltage energy storage device and the hybrid electric motors are intercepted.

Hereinafter, an example of the emergency stop unit will be described with reference to FIG. 2.

Figure 2:
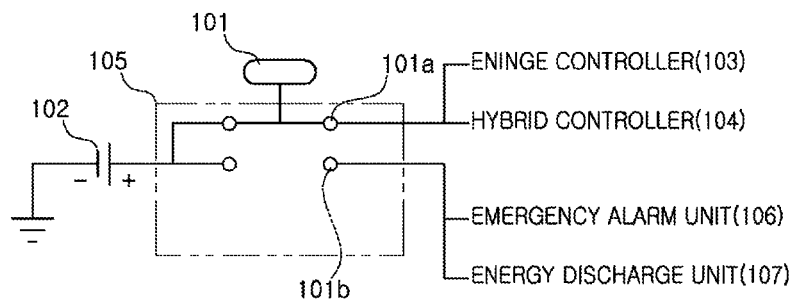
FIG. 2 is a diagram illustrating an emergency stop unit according to an embodiment of the present invention.

FIG. 2 is a diagram illustrating the emergency stop unit according to a preferred embodiment of the present invention.

As illustrated in FIG. 2, the emergency stop unit 105 according to this embodiment includes a first electric contact 101a which is turned on in the normal operation state to supply the input power to the hybrid controller 104 and the engine controller 103, and is turned off when the emergency switch 101 is pressed to intercept the input power to the hybrid controller 104 and the engine controller 103, and a second electric contact 101b which is turned on when the emergency switch 101 is pressed to supply the input power supply to another path (for example, the emergency alarm unit or the energy discharge unit).

The first electric contact 101a is turned on in the normal operation state to supply the power that is applied from the power supply unit 102 to the hybrid controller 104 and the engine controller 103, and is turned off when the emergency switch 101 is pressed (that is, when the equipment abnormality or emergency situation occurs) to intercept the input power supply to the hybrid controller 104 and the engine controller 103.

The second electric contact 101b is turned off in the normal operation state to make the power that is applied from the power supply unit 102 supplied to the hybrid controller 104 and the engine controller 103, and is turned on when the emergency switch 101 is pressed (that is, when the equipment abnormality or emergency situation occurs) to intercept the input power supply to the hybrid controller 104 and the engine controller 103 and to make the input power be supplied to the other path (that is, the emergency alarm unit or the energy discharge unit).

The operation of the emergency stop system for a hybrid excavator using the emergency stop unit having the above-described configuration in FIG. 1 according to an embodiment of the present invention will be described with reference to FIG. 3.

Figure 3:
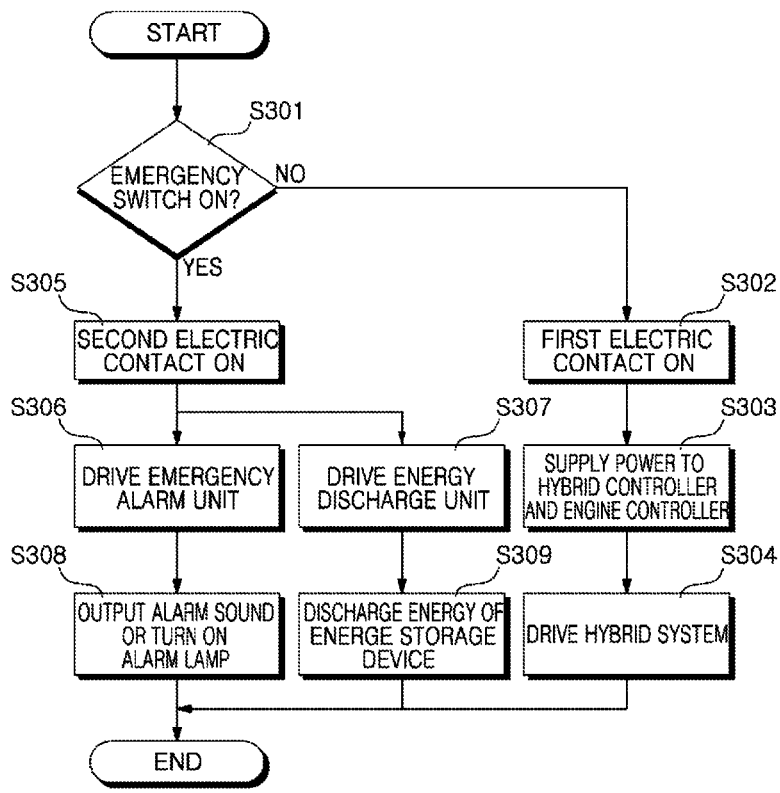
FIG. 3 is a flowchart illustrating the operation of an emergency stop system for a hybrid excavator according to an embodiment of the present invention.

FIG. 3 is a flowchart illustrating the operation of the emergency stop system for a hybrid excavator according to an embodiment of the present invention.

First, when the emergency stop unit normally operates, the system supplies the power that is applied from the power supply unit to the hybrid controller and the engine controller.

By contrast, when the emergency switch is pressed, the system intercepts the power supply to the hybrid controller and the engine controller.

Then, the system makes the power be supplied to the other path (for example, the emergency alarm unit or the energy discharge unit).

The details thereof are as follows.

The first electric contact 101a is turned on in the normal operation state to supply the power that is applied from the power supply unit to the hybrid controller and the engine controller.

When the emergency switch is pressed (that is, when the equipment abnormality or emergency situation occurs), the first electric contact 101a is turned off to intercept the input power supply to the hybrid controller and the engine controller.

On the other hand, the second electric contact 101b is turned off in the normal operation state to make the power that is applied from the power supply unit be supplied to the hybrid controller and the engine controller (S301 to S303).

When the emergency switch is pressed (that is, when the equipment abnormality or emergency situation occurs), the second electric contact 101b is turned to intercept the input power supply to the hybrid controller and the engine controller and to make the input power be supplied to the other path (that is, the emergency alarm unit or the energy discharge unit).

If the input power is supplied to the other path as the emergency switch is pressed (that is, as the equipment abnormality or emergency situation occurs), the emergency alarm unit receives the input power.

Then, the emergency alarm unit produces the alarm sound or turns on the alarm lamp to notify the outside of the equipment abnormality or emergency situation.

At this time, the power supply to the hybrid controller and the engine controller is intercepted.

In addition, the power is not supplied to the energy discharge unit in the normal operation state, but the power is supplied thereto when the emergency switch is pressed, that is, when the equipment abnormality or the emergency situation occurs.

If the power is supplied to the energy discharge unit, the energy discharge unit discharges the energy of the energy storage device to make the hybrid power source vanish completely (S305 to S309).

On the other hand, the power supply to the electric motor/generator controller, the swing electric motor controller, the swing electric motor parking brake, and the energy storage device contactors is intercepted in association with the interception of the power supply to the hybrid controller (S304).

As a result, the operations of the hybrid electric motor controller and the swing electric motor are physically stopped, and the connections between the high-voltage energy storage device and the hybrid electric motors are intercepted.

As described above, according to the present invention, in the normal operation state, the power that is applied from the power supply unit is supplied to the hybrid controller and the engine controller, whereas when the emergency switch is pressed, the power that is supplied to the hybrid controller and the engine controller is intercepted to effectively stop the operation of the hybrid system in the case where the equipment abnormality or emergency situation occurs.

Further, when the emergency switch is pressed, the power supply is applied to the emergency alarm unit and the energy discharge unit to notify the operator and neighboring persons of the occurrence of the equipment abnormality and emergency situation and to make the hybrid power source vanish completely.

INDUSTRIAL APPLICABILITY

The present invention can be used in the emergency stop system for a hybrid excavator. In the normal operation state, the power that is applied from the power supply unit is supplied to the hybrid controller and the engine controller, and when the emergency switch is pressed, the power that is supplied to the hybrid controller and the engine controller is intercepted to effectively stop the operation of the hybrid system in the case where the equipment abnormality or emergency situation occurs. When the emergency switch is pressed, the power supply is applied to the emergency alarm unit and the energy discharge unit to notify the operator and neighboring persons of the occurrence of the equipment abnormality and emergency situation and to make the hybrid power source vanish completely.

The invention claimed is:

1. An emergency stop system for a hybrid excavator comprising:
    an emergency switch notifying of equipment abnormality and emergency situation occurrence;
    an emergency stop unit including a first contact which is turned on in a normal operation state to provide an input power supply to a hybrid controller and an engine controller and is turned off when the emergency switch is pressed to intercept the input power supply to the hybrid controller and the engine controller, and a second contact which is turned on when the emergency switch is pressed to provide the input power supply through another path; and
    an energy discharge unit connected to the second contact of the emergency stop unit to discharge energy of an energy storage device by the input power supply applied thereto through the second contact when the input power supply to the hybrid controller and the engine controller is intercepted;
    wherein at least one of an electric motor/generator controller, a swing electric motor controller, a swing electric motor parking brake, and energy storage device contactors, which are connected to the hybrid controller, interlocks with the input power supply, and is intercepted when the input power supply to the hybrid controller and the engine controller is intercepted.

2. The emergency stop system according to claim 1, further comprising an emergency alarm unit connected to the second contact of the emergency stop unit to be driven by the input power supply applied thereto through the second contact when the input power supply to the hybrid controller and the engine controller is intercepted.

3. An emergency stop system for a hybrid excavator comprising:
    a power supply unit configured to power an engine controller and a hybrid controller, the power supply unit further configured to power the following, each of which is connected to the hybrid controller: an electric motor/generator controller, a swing electric motor controller, a swing electric motor parking brake, and an energy storage device contactor;
    an emergency stop unit including an emergency stop switch movable from a non-emergency position to an emergency position;
    an emergency alarm unit configured to be powered by the power supply unit to generate an alert when the emergency stop switch is moved to the emergency position; and
    an energy discharge unit configured to discharge energy from the power supply unit;
    wherein:
        when the emergency stop switch is in the non-emergency position, the emergency stop unit directs power from the power supply unit to the engine controller, the hybrid controller, the electric motor/generator controller, the swing electric motor controller, the swing electric motor parking brake, and the energy storage device contactor; and
        when the emergency stop switch is moved from the non-emergency position to the emergency position by an operator of the hybrid excavator during an emergency, the emergency stop unit: (1) directs power from the power supply unit away from the engine controller, the hybrid controller, the electric motor/ generator controller, the swing electric motor controller, the swing electric motor parking brake, and the energy storage device contactor; and (2) directs power from the power supply unit to the emergency alarm unit and the energy discharge unit.

\* \* \* \* \*